(12) United States Patent
Wu et al.

(10) Patent No.: US 9,525,477 B1
(45) Date of Patent: Dec. 20, 2016

(54) FREQUENCY TRACKING WITH SPARSE PILOTS

(71) Applicant: QUALCOMM Incorporated, San Diego, CA (US)

(72) Inventors: Qiang Wu, San Diego, CA (US); Peter John Black, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/864,831

(22) Filed: Sep. 24, 2015

(51) Int. Cl.
*G06F 15/16* (2006.01)
*H04B 7/185* (2006.01)
*H04L 12/26* (2006.01)
*H04L 5/00* (2006.01)

(52) U.S. Cl.
CPC ......... *H04B 7/18513* (2013.01); *H04L 5/0048* (2013.01); *H04L 43/16* (2013.01)

(58) Field of Classification Search
CPC ........ H04W 84/06; H03M 1/10; H04B 10/516
USPC ........ 455/63.1, 296, 430; 375/224, 319, 340
See application file for complete search history.

(56) References Cited

U.S. PATENT DOCUMENTS

| | | | |
|---|---|---|---|
| 7,558,354 B2 | 7/2009 | Peake et al. | |
| 8,130,631 B2 | 3/2012 | Henriksson et al. | |
| 8,340,072 B2 | 12/2012 | Ma et al. | |
| 8,675,752 B2 | 3/2014 | Lahtonen et al. | |
| 8,774,309 B2 | 7/2014 | Giannakis et al. | |

*Primary Examiner* — Sam Bhattacharya
(74) *Attorney, Agent, or Firm* — Paradice and Li LLP

(57) ABSTRACT

A method and apparatus for estimating a frequency offset of received signals. The receiving device receives a plurality of pilot signals form a transmitting device, and determines an un-aliased frequency offset estimate based on the received pilot signals. The receiving device further determines a low-noise frequency offset estimate based on the received pilot signals, wherein the low-noise frequency offset estimate is blow a threshold noise level. The receiving device then generates a hybrid frequency offset estimate based at least in part on the un-aliased and low-noise frequency offset estimates, wherein the hybrid frequency offset estimate is un-aliased and has a lower estimation noise than the un-aliased frequency offset estimate.

24 Claims, 15 Drawing Sheets

FREQUENCY TRACKING WITH SPARSE PILOTS

INTRODUCTION

Various aspects described herein relate to satellite communications, and more particularly to improving frequency tracking in a user terminal based on sparse pilots transmitted by a satellite.

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beam-forming antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits, such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges. For example, because LEO satellites move quickly across the sky relative to a given point on the earth's surface, beams transmitted from an LEO satellite may pass relatively quickly across the user terminals. This creates fairly substantial Doppler shifting in the apparent carrier frequency of communication signals received at the user terminals (e.g., >150 KHz for LEO satellite communications systems). Such Doppler effects should be accounted for when determining oscillator error (e.g., frequency offsets to be applied to received communication signals) in the user terminals.

Frequency offset estimation is typically performed based on pilot signals (e.g., signals containing known patterns of data) that are transmitted from a satellite to a user terminal. For example, many satellite communications systems follow the DVB-S2 specification for satellite broadcasting. The DVB-S2 specification defines a pilot signal that is transmitted periodically at very long intervals (e.g., commonly referred to as "sparse pilots"). However, because LEO satellite systems exhibit high Doppler shifts as observed by the user terminal, a frequency offset estimation based on two or more consecutive sparse pilots may be affected by aliasing in the received pilot signals. The resulting aliasing errors should be accounted for in order to more accurately estimate the frequency offset in the user terminal.

SUMMARY

Aspects of the disclosure are directed to an apparatus and methods for estimating a frequency offset between a user terminal and a satellite in non-geosynchronous orbit (NGSO) based on sparse pilot signals. In one example, a method of estimating a frequency offset of received signals is disclosed. The method may include receiving a plurality of pilot signals from a transmitter, determining an un-aliased frequency offset estimate based on the received pilot signals, determining a low-noise frequency offset estimate based on the received pilot signals (an estimation noise of the low-noise frequency offset estimate is below a threshold noise level), and generating a hybrid frequency offset estimate based at least in part on the un-aliased frequency offset estimate and the low noise frequency offset estimate, wherein the hybrid frequency offset estimate is un-aliased and has a lower estimation noise than the un-aliased frequency offset estimate.

In another example, a wireless communications device is disclosed. The wireless communications device may include a receiver to receive a plurality of pilot signals from a transmitter, one or more processors, and a memory storing instructions. Execution of the instructions by the one or more processors may cause the wireless communications device to determine an un-aliased frequency offset estimate based on the received pilot signals, determine a low-noise frequency offset estimate based on the received pilot signals (an estimation noise of the low-noise frequency offset estimate is below a threshold noise level), and generate a hybrid frequency offset estimate based at least in part on the un-aliased frequency offset estimate and the low-noise frequency offset estimate, wherein the hybrid frequency offset estimate is un-aliased and has a lower estimation noise than the un-aliased frequency offset estimate.

In another example, a wireless communications device is disclosed. The wireless communications device may include means for receiving a plurality of pilot signals from a transmitter, means for determining an un-aliased frequency offset estimate based on the received pilot signals, means for determining a low-noise frequency offset estimate based on the received pilot signals (an estimation noise of the low-noise frequency offset estimate is below a threshold noise level), and means for generating a hybrid frequency offset estimated based at least in part on the un-aliased frequency offset estimate and the low-noise frequency offset estimate, wherein the hybrid frequency offset estimate is un-aliased and has a lower estimation noise than the un-aliased frequency offset estimate.

In another example, a non-transitory computer-readable medium is disclosed. The non-transitory computer-readable medium may store instructions that, when executed by one or more processors provided within a wireless communications device, cause the wireless communications device to receive a plurality of pilot signals from a transmitter, determine an un-aliased frequency offset estimate based on the received pilot signals, determine a low-noise frequency offset estimate based on the received pilot signals (an estimation noise of the low-noise frequency offset estimate is below a threshold noise level), and generate a hybrid frequency offset estimate based at least in part on the un-aliased frequency offset estimate and the low-noise frequency offset estimate, wherein the hybrid frequency offset estimate is un-aliased and has a lower estimation noise than the un-aliased frequency offset estimate.

BRIEF DESCRIPTION OF THE DRAWINGS

Aspects of this disclosure are illustrated by way of example and are not intended to be limited by the figures of the accompanying drawings, where.

Like reference numerals refer to corresponding parts throughout the drawing figures.

DETAILED DESCRIPTION

Figure 1:
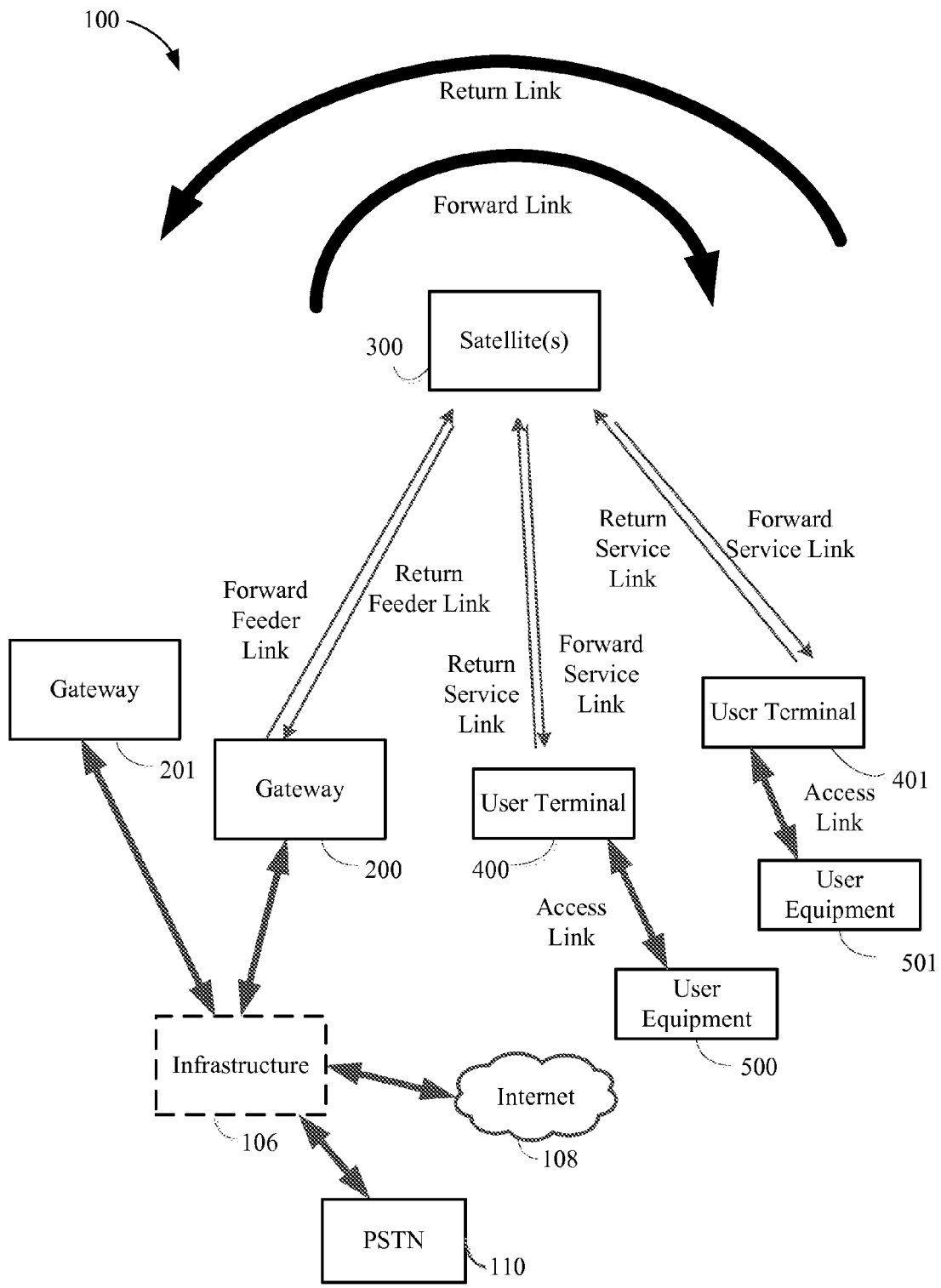
FIG. 1 shows a block diagram of an example communication system.

The example implementations described herein may allow a user terminal to estimate a frequency offset in signals received via an NGSO satellite communications system. As described in more detail below, the frequency offset may be estimated based on received pilot signals (specifically, "sparse pilots"). An un-aliased frequency offset estimate may be determined based on a single pilot burst, for example, by splitting the pilot burst into two or more split-pilot bursts. A low-noise frequency offset estimate may be determined based on two or more consecutive pilot bursts. Thereafter, the un-aliased frequency offset estimate may be combined with the low-noise frequency offset estimate to generate a hybrid frequency offset estimate for the received signals that is un-aliased and has low estimation noise.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation. The word "robust" is used herein to refer to a signal that has a low amount of noise (e.g., compared to other signals), and the word "accurate" is used herein to refer to a signal that has a low amount of aliasing (e.g., compared to other signals).

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
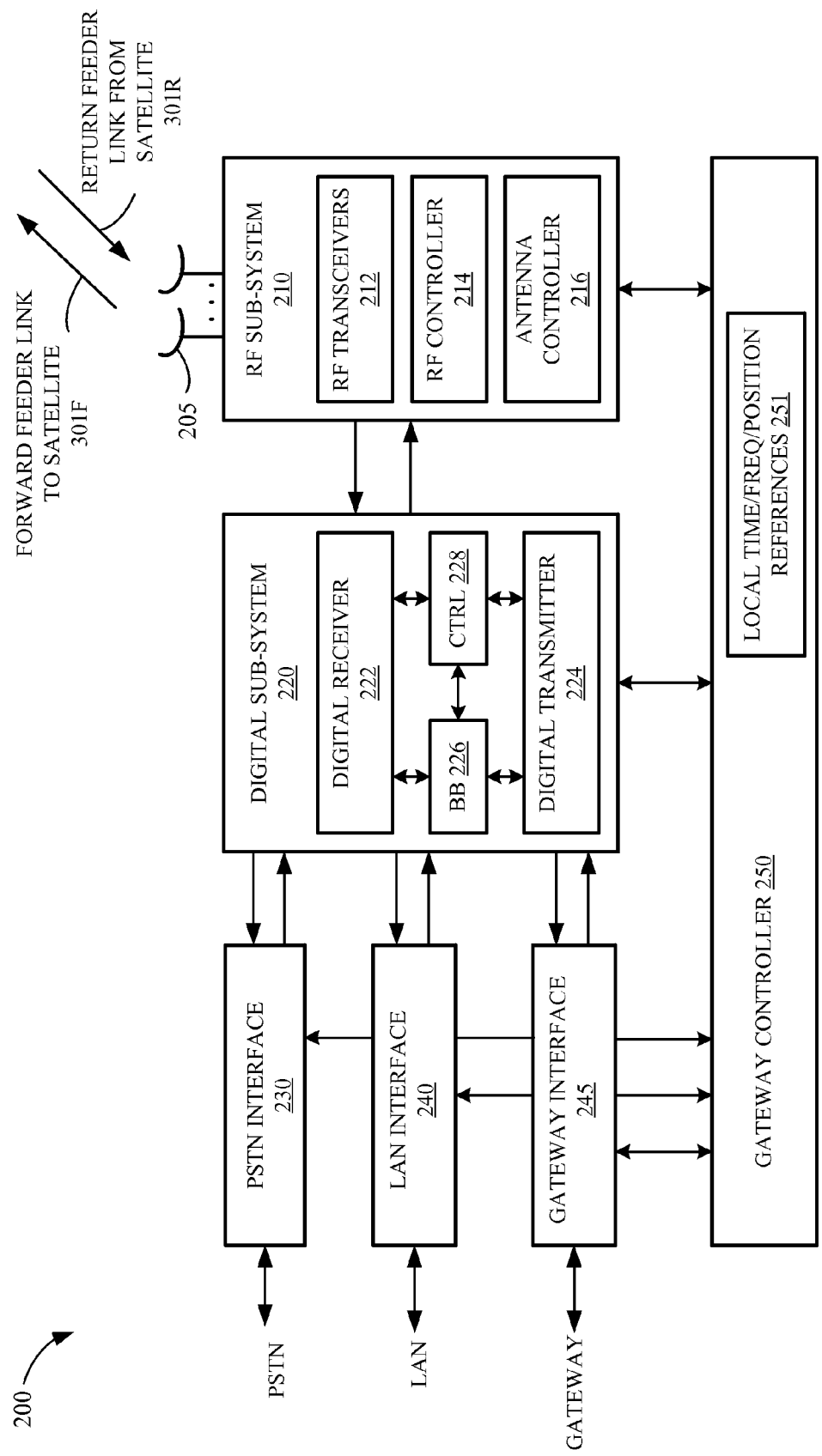
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
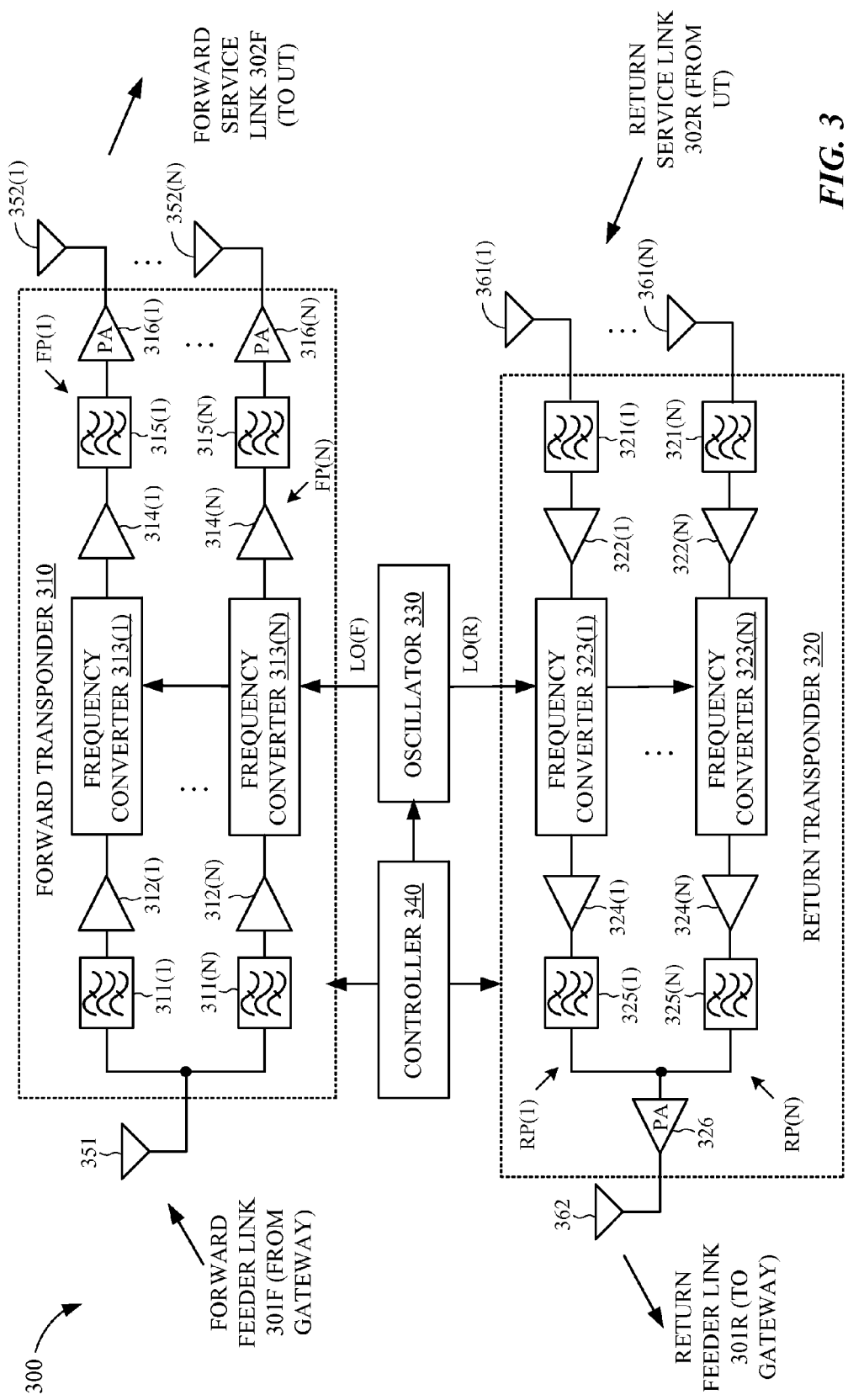
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various communication operations of satellite 300 including (but not limited to) channel allocations and beam steering. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform the various communication operations.

Figure 4:
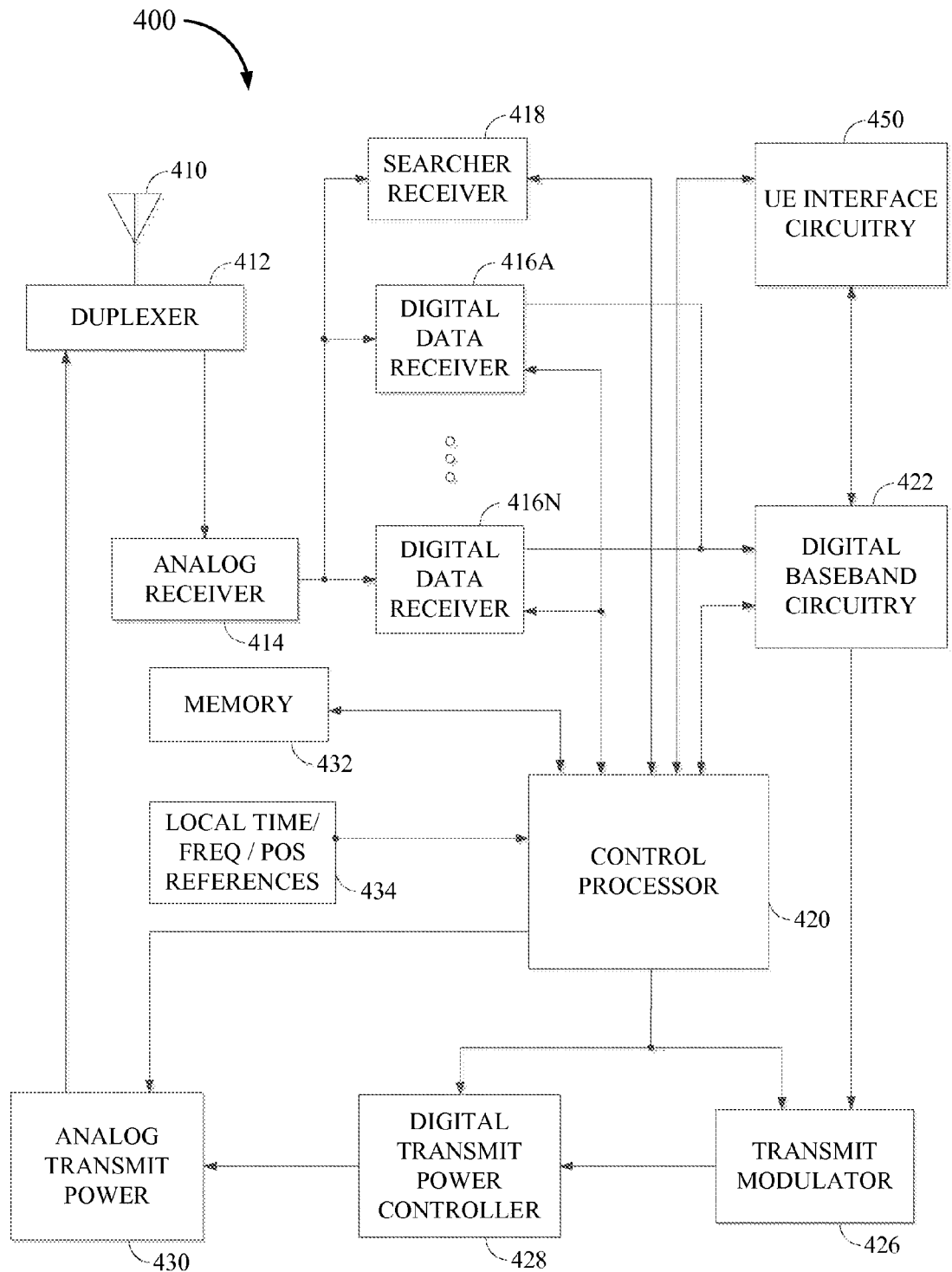
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, the control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
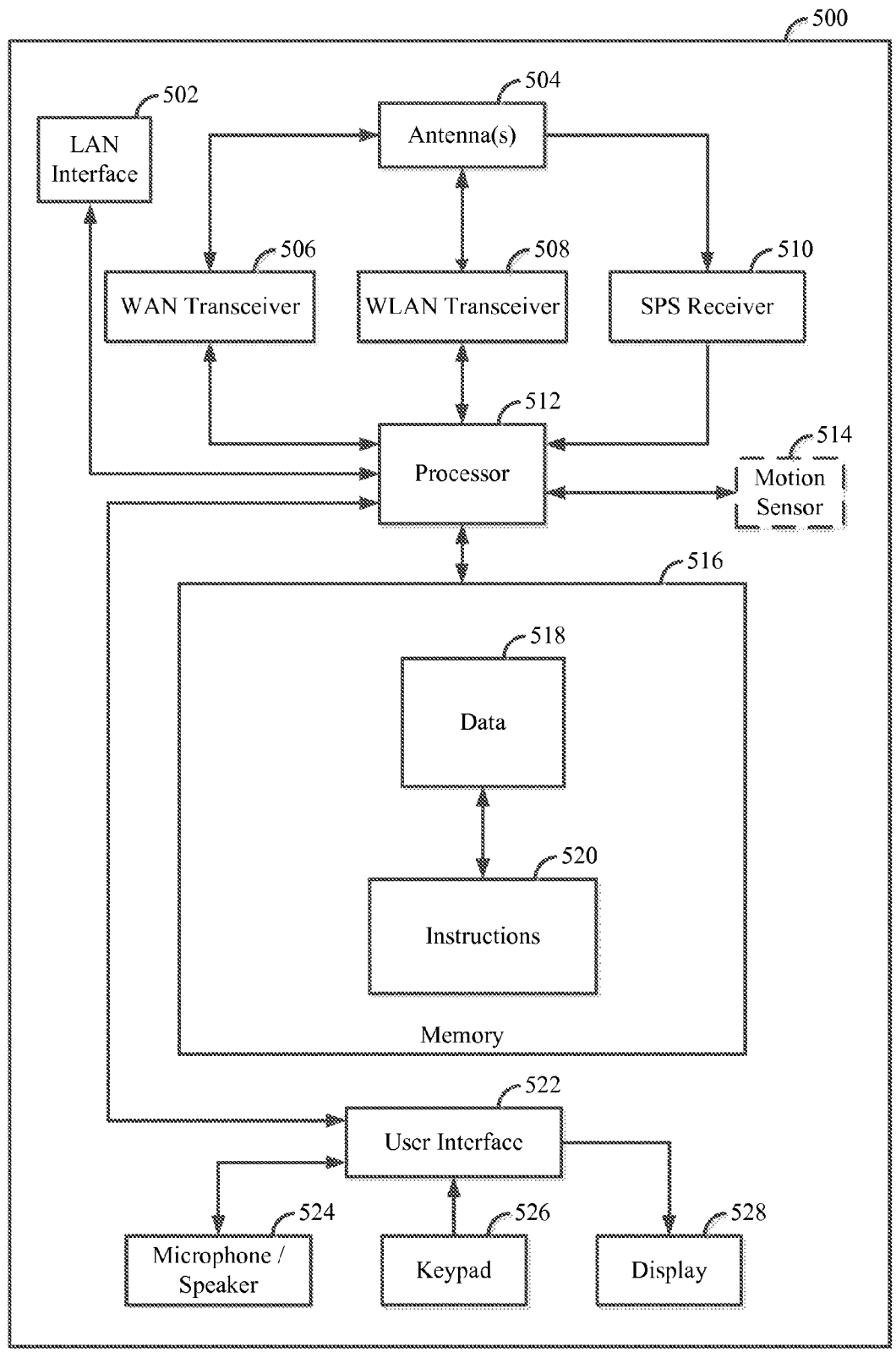
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the earth's surface, and revolve around the Earth in an equatorial orbit at the earth's own angular velocity. In contrast, NGSO satellites are deployed in non-geostationary orbits and revolve around the earth above various paths of the earth's surface at relatively low altitudes (e.g., as compared with GSO satellites). Moreover, communication systems employing NGSO satellites exhibit a high degree of relative motion between the user terminals (UT) and the satellites. This creates fairly substantial Doppler shifting (e.g., >150 KHz).

Figure 6:
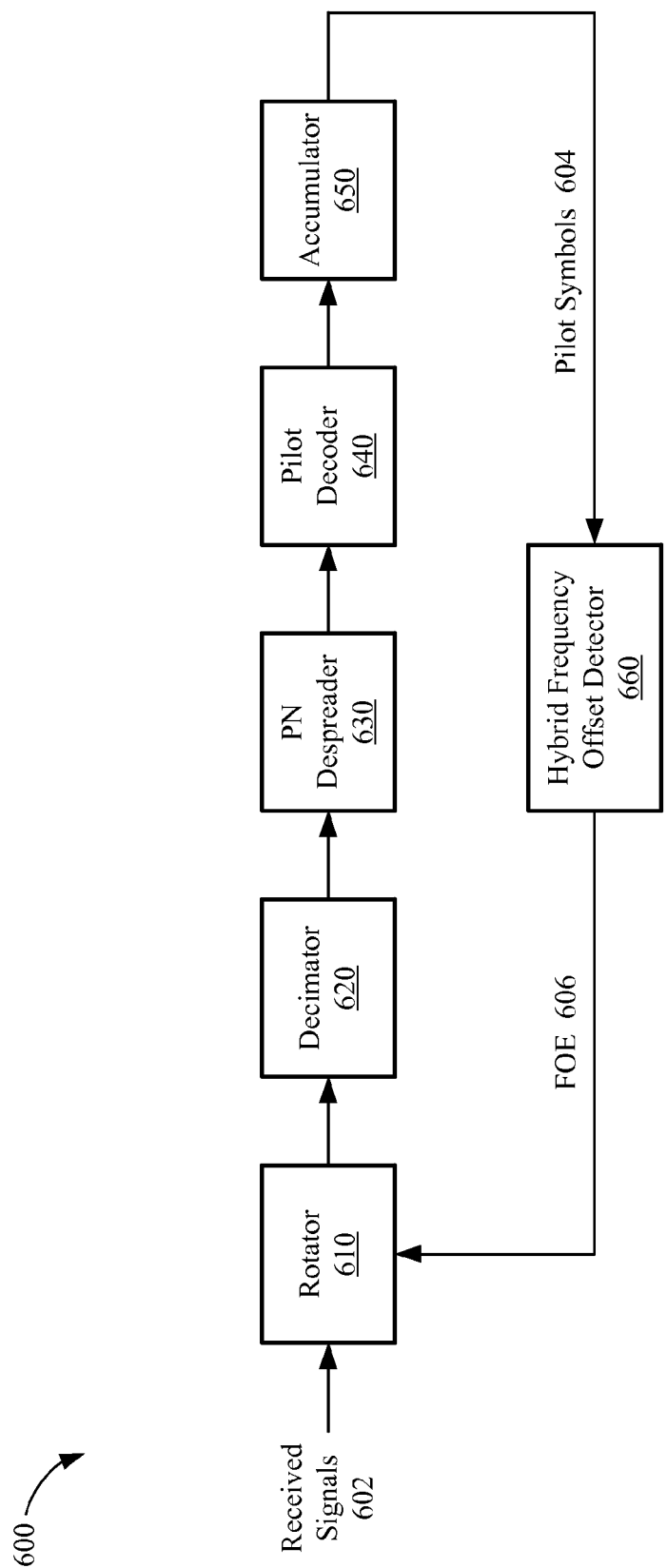
FIG. 6 shows a block diagram of an example frequency tracking loop in accordance with some implementations.

FIG. 6 shows a block diagram of an example frequency tracking loop (FTL). The example FTL 600 may be configured to process pilot signals received from a satellite (e.g., satellite 300), and to detect frequency offsets in signals received by the UTs 400. Pilot signals are typically used in spread-spectrum communication systems (e.g., satellite communication systems) as a coherent phase reference for forward link signals. For example, a pilot signal may be transmitted by satellite 300 and thereafter used by UT 400 as a reference signal to obtain initial system synchronization, and to obtain time, frequency, and phase tracking of other signals transmitted by the satellite 300. For example, phase information obtained from tracking a pilot signal may be used as a carrier phase reference for coherent demodulation of data signals received from the satellite 300. In some aspects, the received pilot signals are "sparse" in that they are transmitted very infrequently by the satellite 300. In some aspects, the satellite 300 may transmit each pilot signal as a pilot burst (e.g., a burst of carrier traffic including one or more pilot symbols).

The example FTL 600 is shown to include a rotator 610, a decimator 620, a pseudo noise (PN) despreader 630, a pilot decoder 640, an accumulator 650, and a hybrid frequency offset detector 660. Signals 602 received from satellite 300 (e.g., via analog receiver 414 of FIG. 4) are input to the rotator 610, which may operate at a preselected frequency or phase rotation. Ideally, the rotator 610 is tuned to a center frequency that coincides with a carrier frequency of the received signals 602. Since the satellite communication system 100 operates within fixed sets of frequency bands for communication signals, the center or nominal carrier frequencies associated with the service links are known. However, due to Doppler shifts and/or other sources of frequency or timing offsets in the forward service link, the center frequency of the rotator 610 may not initially coincide with the actual frequency of the received signals 602. In some aspects, the rotator 610 may dynamically adjust its center frequency (e.g., and thus the amount of phase rotation applied to the received signals 602) based on feedback generated by the hybrid frequency offset detector 660, as described in more detail below.

The sequence of rotated samples output from the rotator 610 may be subsampled by the decimator 620, for example, to reduce the sampling rate of the received signals 602. The PN despreader 630 despreads the decimated samples provided by the decimator 620 using a known PN sequence, and the pilot decoder 640 recovers pilot signal data from the despread signals, for example, using a known orthogonal code (e.g., a code that was used to generate the pilot signals). The recovered pilot signal data may be accumulated over a symbol period in the accumulator 650, which outputs accumulated pilot symbols 604 to the hybrid frequency offset detector 660. The hybrid frequency offset detector 660 may identify phase errors in the accumulated pilot symbols 604, and may generate a frequency offset estimate (FOE) 606 based on the detected phase errors. The FOE 606 is fed back to the rotator 610, for example, as an adjustment factor. The rotator 610 may adjust (or readjust) the amount of phase rotation to be applied to the received signals 602 based, at least in part, on the FOE 606.

Pilot signals that are transmitted infrequently may be referred to as "sparse pilots." The intervals between sparse pilots results in a low sampling rate of the received signal relative to the frequency offset (e.g., analog receiver 414), which may cause aliasing in the estimated frequency offset of the received signals 602. For example, when the sampling rate is below the absolute value of the frequency offset, aliasing may occur in the estimated frequency offset. That is, the estimated frequency offset based on two (or more) successive sparse pilots may be an alias of the true frequency offset of the signals. This aliasing may occur in communications systems exhibiting high Doppler shift (e.g., such as NGSO satellite systems)

Figure 7:
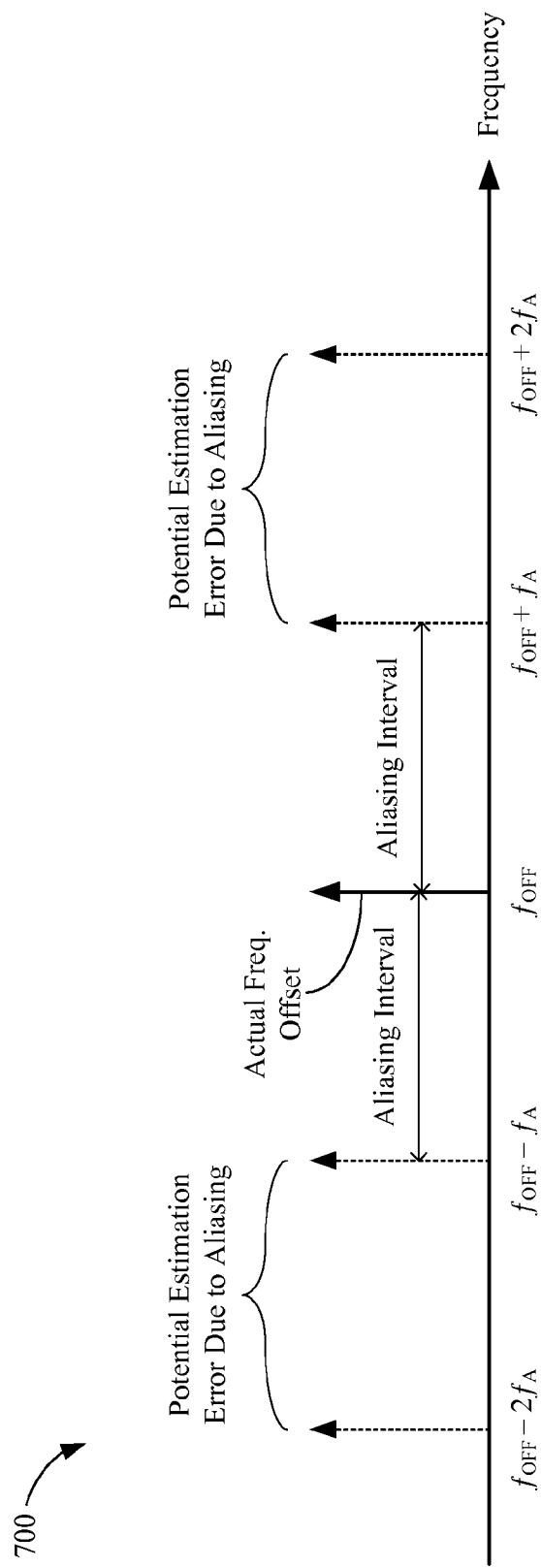
FIG. 7 shows a frequency diagram depicting example aliasing errors in frequency offset estimations based on sparse pilot bursts.

For example, with reference to the example frequency diagram 700 of FIG. 7, the "true" frequency offset of the signal received by a user terminal is denoted by $f_{OFF}$. However, due to aliasing, the estimated frequency offset based on two or more successive sparse pilots may result in an aliasing error ($Nf_A$). Thus, the estimated frequency offset ($f_C$) can be expressed as:

$$f_C = f_{OFF} + Nf_A + \tilde{n} \quad (1)$$

where $f_A$ is the aliasing frequency, N is an integer value representing a number N of aliasing intervals, and $\tilde{n}$ is a noise component of the estimation. As shown in FIG. 7, the estimated frequency offset $f_C$ based on two consecutive pilot bursts can be an aliased frequency offset from the set { . . . , $f_{OFF} - 2f_A$, $f_{OFF} - f_A$, $f_{OFF} + f_A$, $f_{OFF} + 2f_A$, . . . }.

For example, the hybrid frequency offset detector 660 may generate an aliased frequency offset estimate with low estimation noise based on two or more successively received pilot signals or bursts, may generate an un-aliased frequency offset estimate with high estimation noise based on a single received pilot signal or burst, and may combine the two estimates to produce an un-aliased and less noisy estimate of the frequency offset. In other words, the un-aliased (and more noisy) estimate can be used to de-alias the aliased and less noisy estimate.

Figure 8:
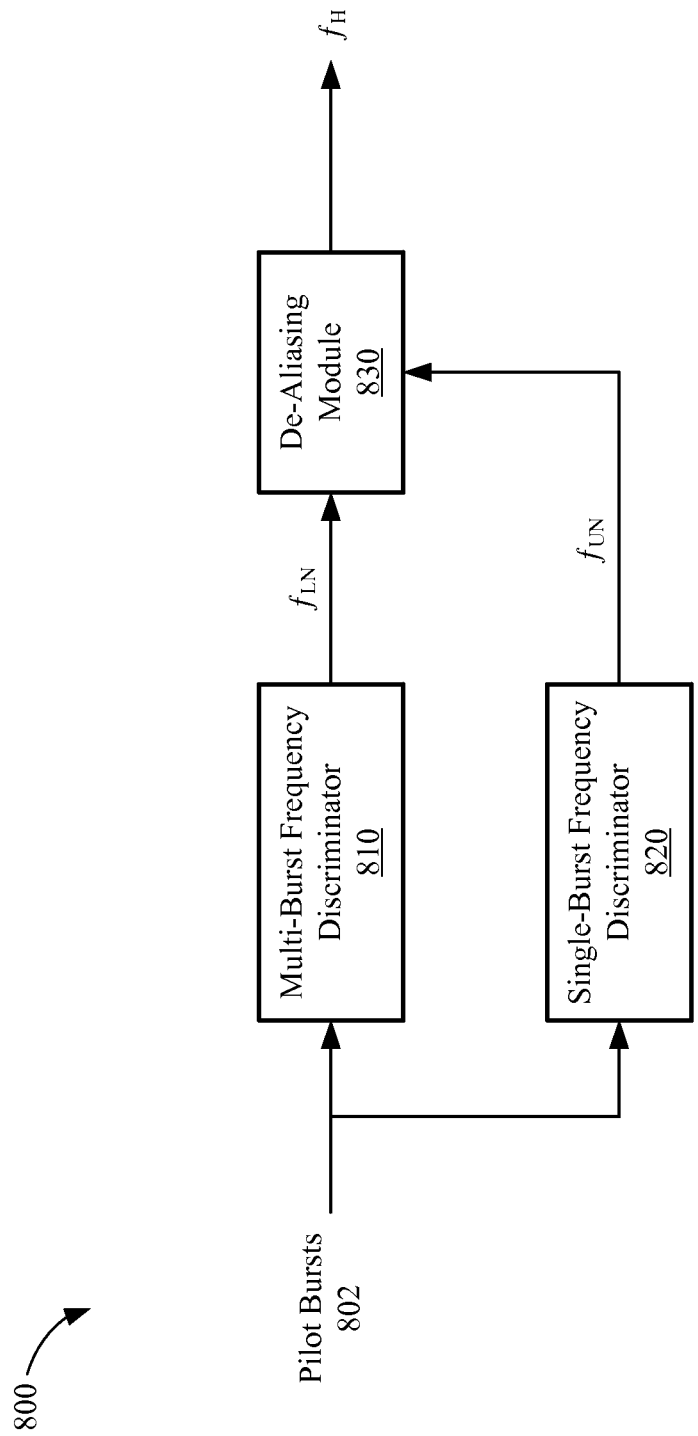
FIG. 8 shows a block diagram of an example hybrid frequency offset detector in accordance with some implementations.

FIG. 8 shows a block diagram of an example hybrid frequency offset detector 800 in accordance with some implementations. The hybrid frequency offset detector 800 may be a particular implementation of hybrid frequency offset detector 660 of FIG. 6.

Figure 9A:
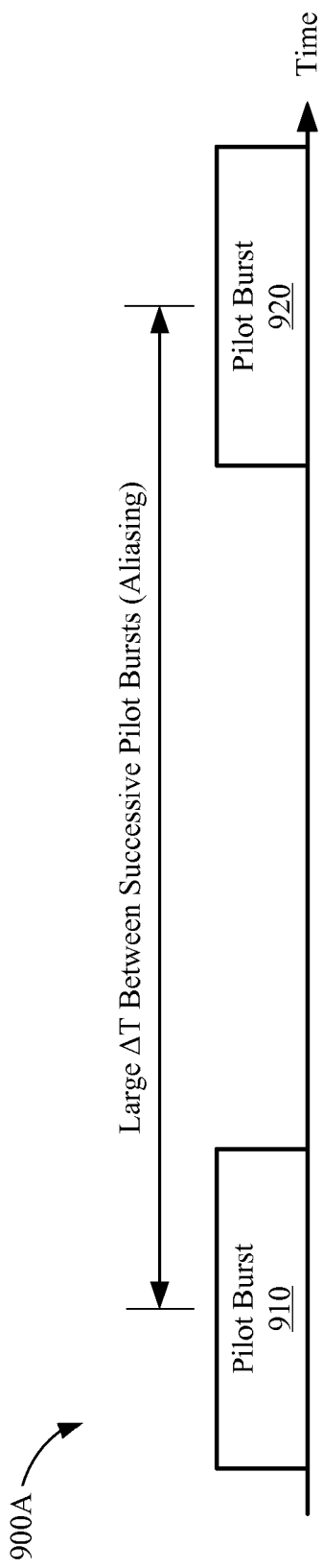
FIG. 9A shows a timing diagram depicting example sparse pilot bursts in accordance with some implementations.

The example hybrid frequency offset detector 800 is shown to include a multi-burst frequency discriminator 810, a single-burst frequency discriminator 820, and a de-aliasing module 830. The multi-burst frequency discriminator 810 receives a sequence of pilot bursts 802 (e.g., from accumulator 650 of FIG. 6), and generates a low-noise frequency offset estimate ($f_{LN}$) based on two or more successive pilot bursts 802. In some implementations, the multi-burst frequency discriminator 810 may be any suitable frequency discriminator (e.g., a cross-product discriminator) known in the art. For example, with reference to the example timing diagram 900A of FIG. 9A, the multi-burst frequency discriminator 810 may generate the low-noise frequency offset estimate $f_{LN}$ by taking the vector cross product of a first pilot burst 910 and a second pilot burst 920. However, as shown in FIG. 9A, there is a long duration of time (ΔT) between successive pilot bursts 910 and 920 (e.g., because the pilot bursts 910 and 920 are sparse), which may cause aliasing errors in the frequency offset estimate $f_{LN}$ (e.g., as described above with respect to FIG. 6).

Figure 9B:
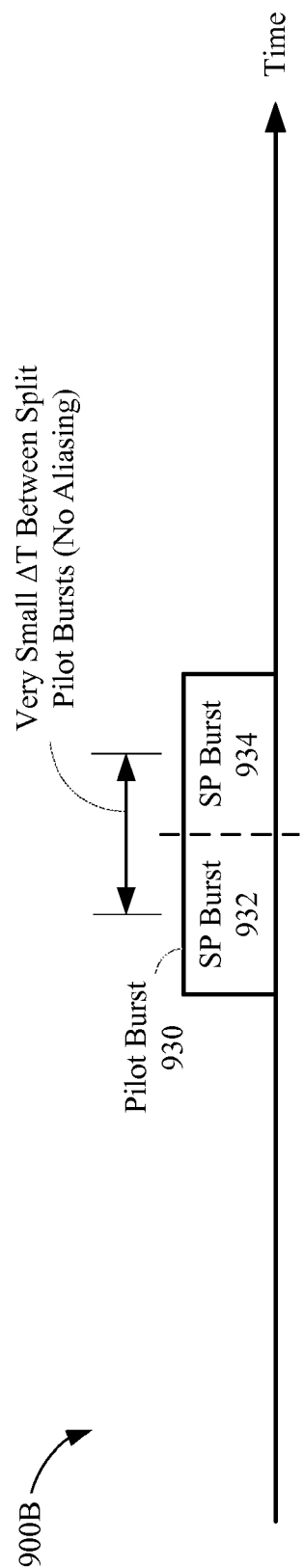
FIG. 9B shows a timing diagram depicting example split pilot bursts in accordance with some implementations.

The single-burst frequency discriminator 820 receives the pilot bursts 802, and generates an un-aliased frequency offset estimate ($f_{UN}$) based on a single one of pilot bursts 802. In some implementations, the single-burst frequency discriminator 820 may generate the un-aliased frequency offset estimate $f_{UN}$ based on two halves of the same pilot burst. For example, with reference to the example timing diagram 900B of FIG. 9B, the single-burst frequency discriminator 820 may divide a single pilot burst 930 into two (or more) split-pilot (SP) bursts 932 and 934. The single-burst frequency discriminator 820 may then generate the frequency offset estimate $f_{UN}$ by taking the vector cross product of the first split-pilot burst 932 and the second split-pilot burst 934. As shown in FIG. 9B, there is a short duration of time (e.g., ΔT 0) between the split-pilot bursts 932 and 934 because they correspond to separate halves of the same pilot burst 930. Accordingly, there will be no aliasing errors in the frequency offset estimate $f_{UN}$.

Although splitting a pilot burst into halves (or "pilot sub-bursts") produces an un-aliased frequency offset estimate, the resulting frequency offset estimate $f_{UN}$ is more susceptible to noise than the frequency offset estimate $f_{LN}$. In general, the frequency offset estimate $f_{LN}$ generated by the multi-burst frequency offset discriminator 810, although aliased, is less susceptible to noise than the frequency offset estimate $f_{UN}$ generated by the single-burst frequency offset discriminator 820.

The de-aliasing module 830 combines the low-noise frequency offset estimate $f_{LN}$ with the un-aliased frequency offset estimate $f_{UN}$ to produce a hybrid frequency offset estimate $f_H$ that is un-aliased and has low noise. For some implementations, the de-aliasing module 830 may use the un-aliased frequency offset estimate $f_{UN}$ to de-alias (e.g., remove aliasing error from) the low-noise frequency offset estimate $f_{LN}$. In $f_{UN}$, estimation noise is typically much smaller than the aliasing frequency (e.g., $|ñ|<<|f_A|$). The de-aliasing module can be implemented as follows: $f_H=f_{LN}+M*f_A$, where M is chosen to be the integer value such that the resulting $f_H$ is nearest to $f_{UN}$. Note that $f_A$ is a known parameter determined by the time interval between pilot bursts.

In some aspects, the de-aliasing module 830 may use the un-aliased frequency offset estimate $f_{UN}$ to determine an initial (e.g., a "coarse") frequency range for the actual frequency offset estimate $f_{OFF}$. The de-aliasing module 830 may compare the un-aliased frequency offset estimate $f_{UN}$ with the low-noise frequency offset estimate $f_{LN}$ to refine the frequency offset estimate (e.g., towards the actual frequency offset estimate $f_{OFF}$). For example, based on the comparison, the de-aliasing module 830 may determine the degree of aliasing that would effectively de-alias the frequency offset estimate $f_{LN}$ to arrive at the hybrid frequency offset estimate ($f_H$).

Figure 11:
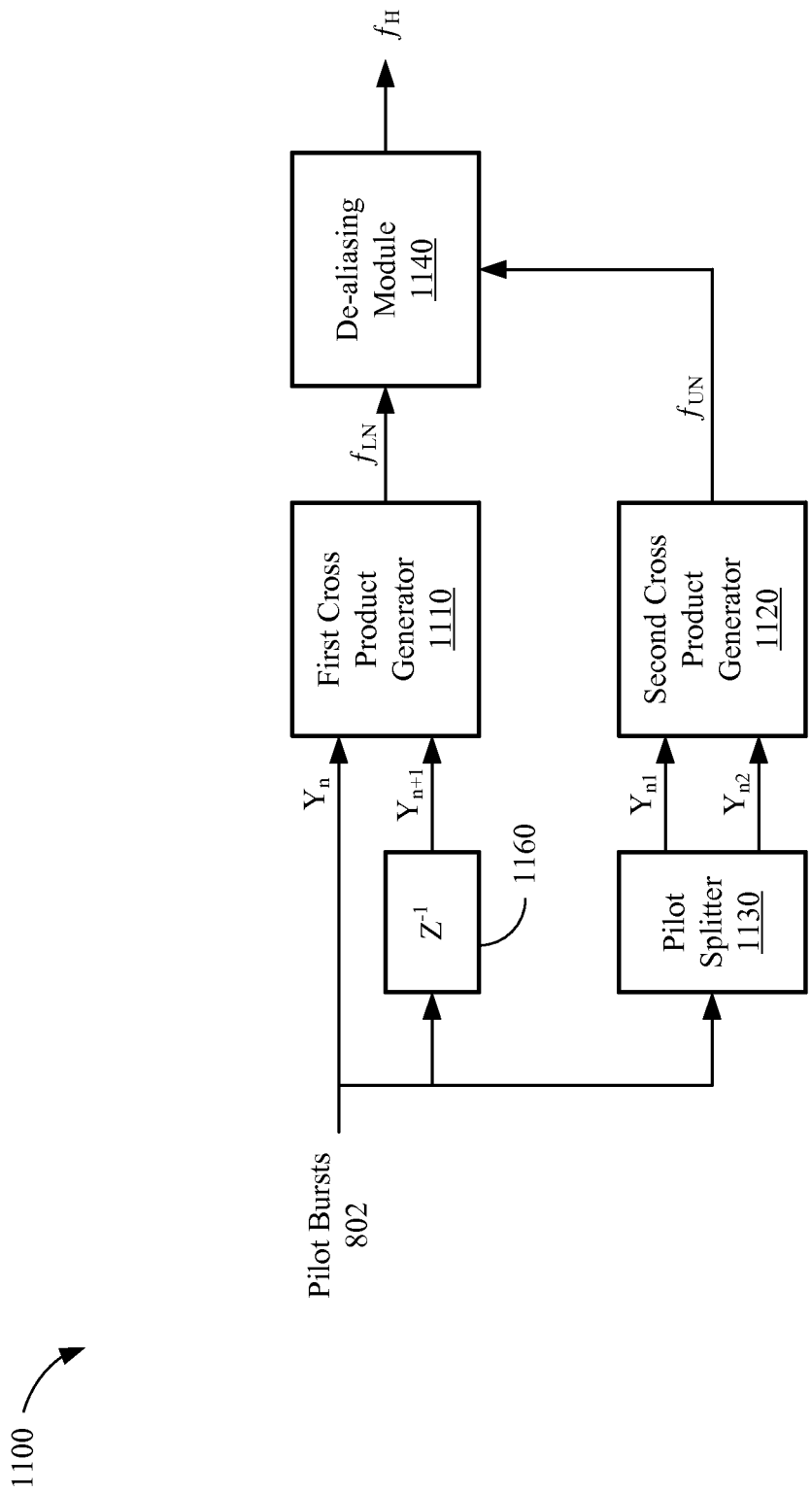
FIG. 11 shows a block diagram of a more detailed example of the hybrid frequency offset detector shown in FIG. 8.

FIG. 11 shows a block diagram of a more detailed example of the hybrid frequency offset detector shown in FIG. 8. The hybrid frequency offset detector 1100 includes first and second cross product generators 1110 and 1120, a pilot splitter 1130, a de-aliasing module 1140, and a delay stage 1160. In some aspects, the pilot bursts 802 may be represented by sequences of pilot symbols, with each pilot burst 802 corresponding to one sequence of pilot symbols which are accumulated into a single pilot symbol ($Y_n$) with a low noise. A copy of each pilot symbol $Y_n$ is passed through delay stage 1160 to produce a delayed pilot symbol $Y_{n+1}$. For example, the delay stage 1160 may delay the pilot symbol $Y_n$ by a time period between $Y_n$ and $Y_{n+1}$. The first cross product generator 1110 forms a vector cross product between a given pilot symbol $Y_n$ and the delayed pilot symbol $Y_{n+1}$ to determine a phase error between the two symbols $Y_n$ and $Y_{n+1}$. This provides a precise (e.g., low-noise) estimate of the frequency offset of the received communication signal. The first cross product generator 1110 outputs a low-noise frequency offset estimate $f_{LN}$.

The pilot splitter 1130 splits the given pilot symbol $Y_n$ into two halves ($Y_{n1}$ and $Y_{n2}$) of substantially equal lengths (e.g., the amount of symbols carried on $Y_{n1}$ is equal to the amount of symbols carried on $Y_{n2}$). The pilot splitter 1130 may divide the pilot burst by one-half so that the first accumulated pilot symbol $Y_{n1}$ may be indicative of a first split-pilot burst (e.g., split-pilot burst 932 of FIG. 9B), and the second half of the pilot symbol $Y_{n2}$ may be indicative of a second split-pilot burst (e.g., split-pilot burst 934 of FIG. 9B). The second cross product generator 1120 forms a vector cross product between the first half of the pilot symbol $Y_{n1}$ and the second half of the pilot symbol $Y_{n2}$ to determine a phase differential between the two symbols $Y_{n1}$ and $Y_{n2}$. This provides an un-aliased estimate of the error in the frequency offset of the received communication signal. The second cross product generator 1120 outputs an un-aliased frequency offset estimate $f_{UN}$ representative of the determined phase differential.

The de-aliasing module 1140 receives both frequency offset estimates $f_{LN}$ and $f_{UN}$, and uses the un-aliased frequency offset estimate $f_{UN}$ to de-alias the low-noise frequency offset estimate $f_{LN}$. As described above, the low-noise frequency offset estimate $f_{LN}$ is aliased, but less affected by noise (e.g., ñ≈0). Thus, by rewriting Equation 1, the low-noise frequency offset estimate $f_{LN}$ may be expressed as:

$$f_{LN} \approx f_{OFF} + Nf_A \qquad (2)$$

In contrast, the un-aliased frequency offset estimate $f_{UN}$ is less susceptible to noise (e.g., compared to the low-noise frequency offset estimate $f_{LN}$), but unaffected by aliasing (e.g., $f_A$=0). Thus, by rewriting Equation 1, the un-aliased frequency offset estimate $f_{UN}$ may be expressed as:

$$f_{UN} = f_{OFF} + ñ \qquad (3)$$

$f_A$ is the known parameter of aliasing frequency determined by the time interval between two pilot bursts. The de-aliasing module generates the hybrid estimate of frequency offset as:

$$f_H = f_{LN} + Mf_A$$

with M being the integer value chosen from all possible integer values such that $f_H$ is the closet to $f_{UN}$. If $|ñ|<\frac{1}{2}|f_A|$, then M will be equal to −N.

Figure 12:
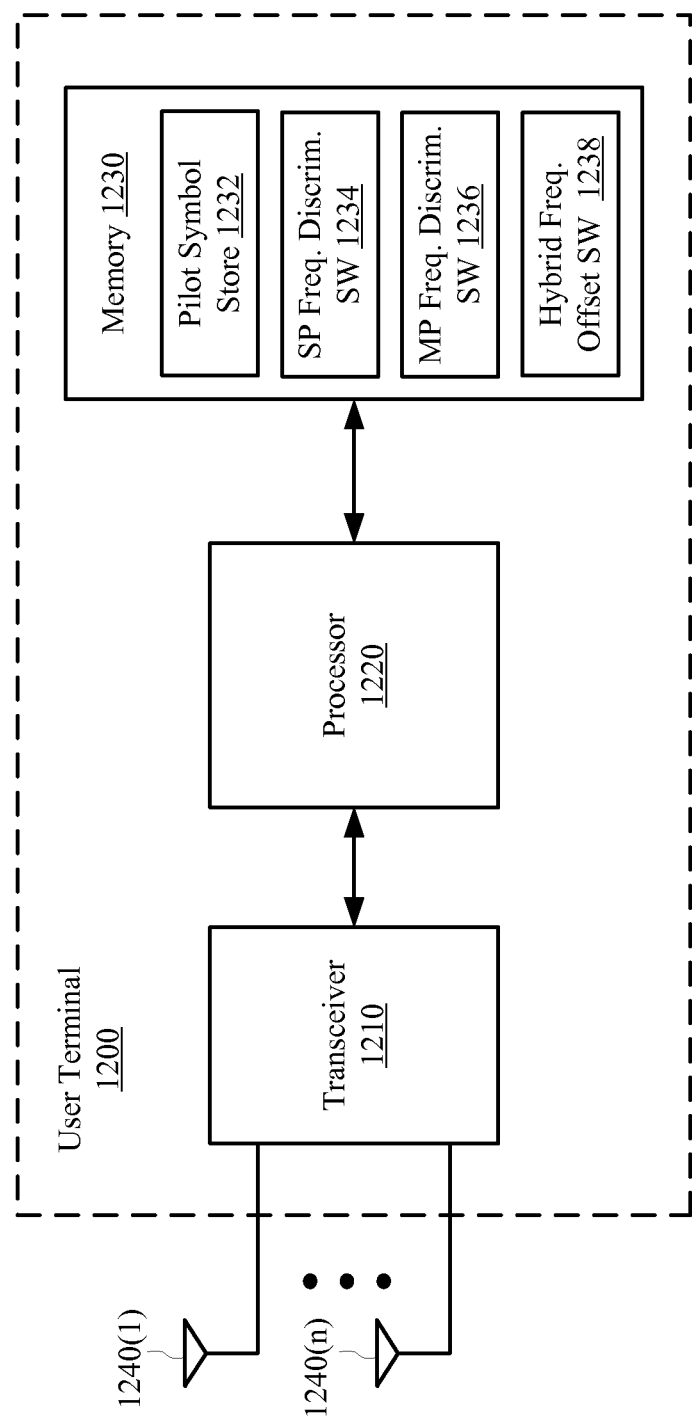
FIG. 12 shows a block diagram of an example user terminal in accordance with some implementations.

FIG. 12 shows a block diagram of an example user terminal 1200 in accordance with some implementations. The user terminal 1200 may be one implementation of any of the UTs 400 and/or 401 of FIG. 4. The user terminal 1200 includes a transceiver 1210, a processor 1220, a memory 1230, and one or more antennas 1240(1)-1240(n). The transceiver 1210 may be used to transmit signals to and receive signals from satellites, UEs, and/or other suitable wireless devices. In some aspects, the transceiver 1210 may include any number of transceiver chains (not shown for simplicity) that may be coupled to any suitable number of antennas 1240(1)-1240(n). Although not shown in FIG. 12 for simplicity, the user terminal 1200 may include antenna selection logic to selectively couple the transceiver chains of transceiver 1210 to antennas 1240(1)-1240(n).

Figure 13:
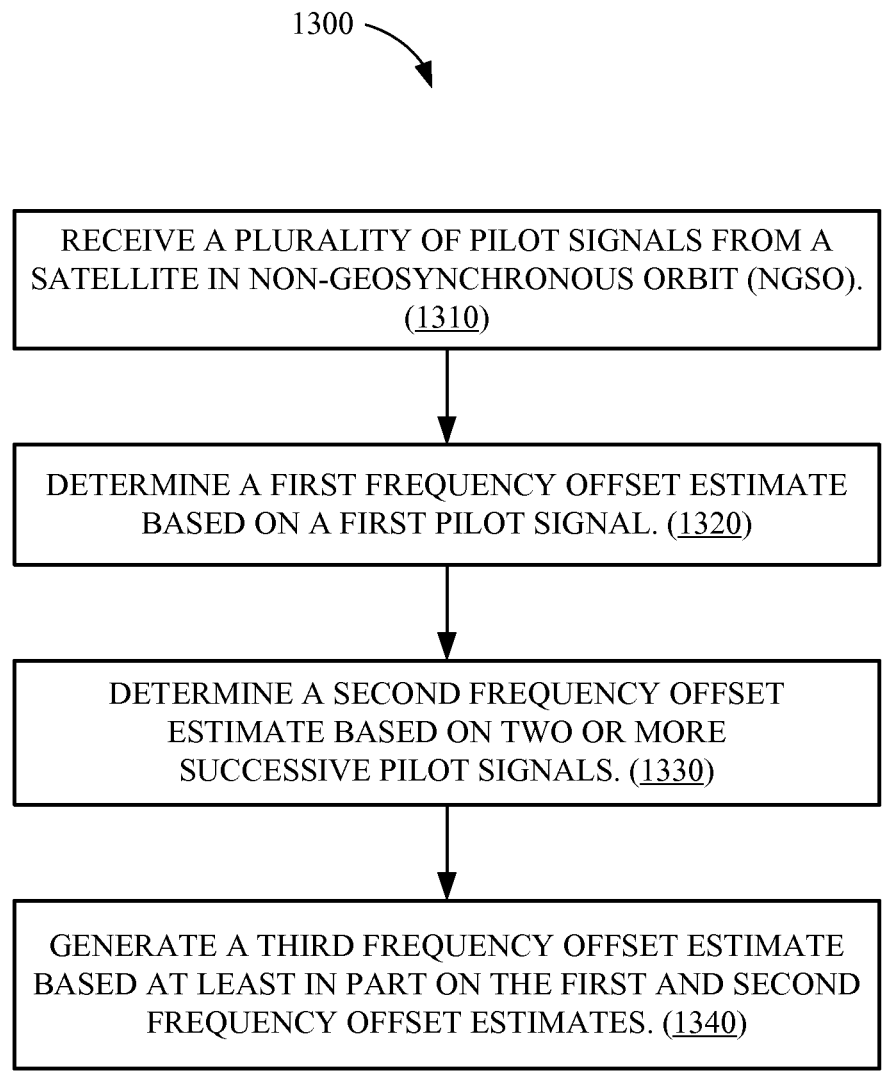
FIG. 13 shows an illustrative flow chart depicting an exemplary hybrid frequency offset estimation operation, in accordance with some implementations.
Figure 14:
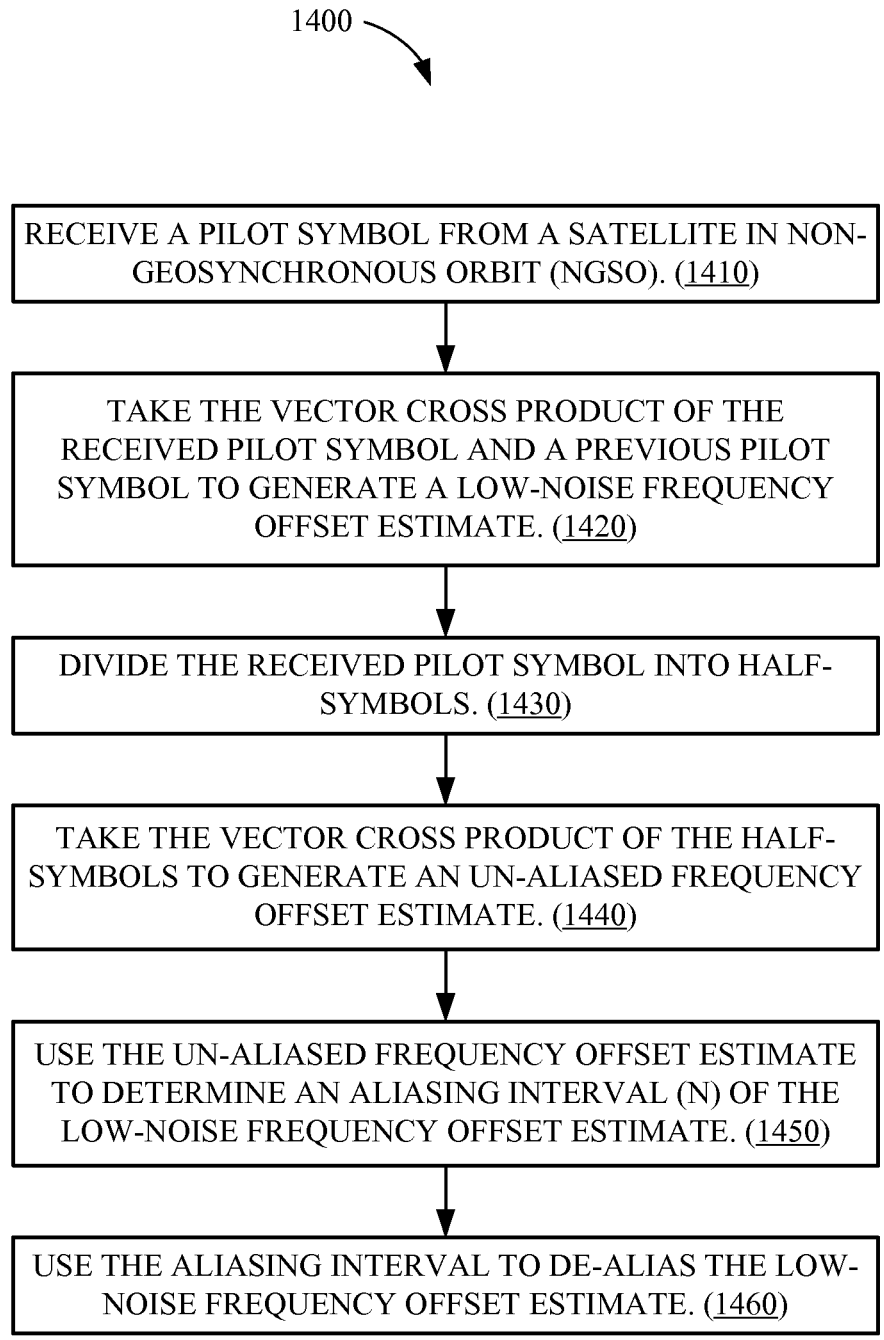
FIG. 14 shows an illustrative flow chart depicting an operation for estimating a low-noise frequency offset without aliasing, in accordance with some implementations.

Memory 1230 may include a pilot symbol store 1232 to store accumulated pilot symbols and/or pilot signal data received via the transceiver 1210. Memory 1230 may also include a non-transitory computer-readable medium (e.g., one or more nonvolatile memory elements, such as EPROM, EEPROM, Flash memory, a hard drive, etc.) that may store at least the following software (SW) modules:

- a split-pilot (SP) frequency discrimination software module 1234 to determine a first frequency offset estimate based on a single pilot burst, for example, as described for one or more operations of FIGS. 13 and 14;
- a multi-pilot (MP) frequency discrimination software module 1236 to determine a second frequency offset estimate based on two or more successive pilot bursts, for example, as described for one or more operations of FIGS. 13 and 14; and
- a hybrid frequency offset software module 1238 to generate a third frequency offset estimate based at least in part on the first and second frequency offset estimates, for example, as described for one or more operations of FIGS. 13 and 14.

Each software module includes instructions that, when executed by processor 1220, causes the user terminal 1200 to perform the corresponding functions. The non-transitory computer-readable medium of memory 1230 thus includes instructions for performing all or a portion of the operations of FIGS. 13 and 14.

Processor 1220 may be any suitable one or more processors capable of executing scripts or instructions of one or more software programs stored in the user terminal 1200 (e.g., within memory 1230). For example, processor 1220 may execute the SP frequency discrimination software module 1234 to determine a first frequency offset estimate based on a single pilot burst. The first frequency offset estimate may be generated by splitting the received single pilot burst into two halves and taking the vector cross product of the two halves. As a result, the first frequency offset estimate is not affected by aliasing that may otherwise occur between successive pilot bursts.

The processor 1220 may also execute the MP frequency discrimination software module 1236 to determine a second frequency offset estimate based on two or more successive pilot bursts. The second frequency offset estimate may be generated by taking the vector cross product of the two or more successive pilot bursts. Because more pilot signal data is used to generate the second frequency offset estimate than the first frequency offset estimate, the second frequency offset estimate may be more robust (e.g., less susceptible to noise) than the first frequency offset estimate.

The processor 1220 may execute the hybrid frequency offset software module 1238 to generate a third frequency offset estimate based at least in part on the first and second frequency offset estimates. For example, the processor 1220, in executing the hybrid frequency offset software module 1238, may use the first frequency offset estimate to de-alias the second frequency offset estimate. As a result, the third frequency offset estimate may be more robust (e.g., less noisy) than the first frequency offset estimate and more accurate (e.g., un-aliased) than the second frequency offset estimate.

FIG. 13 shows an illustrative flow chart depicting an exemplary hybrid frequency offset estimation operation 1300, in accordance with some implementations. With reference, for example, to FIG. 8, the operation 1300 may be performed by the hybrid frequency offset detector 800 to determine a frequency offset of a corresponding user terminal (e.g., UT 400 of FIG. 4) relative to the carrier frequency of a received communications signal. The hybrid frequency offset detector 800 receives a plurality of pilot signals from a satellite in non-geosynchronous orbit (e.g., from satellite 300) (1310). For some aspects, the received pilot signals are "sparse" in that there are long delays between the reception of successive pilot bursts. Thus, as observed by the hybrid frequency offset detector 800 of a user terminal such as UT 400, the pilot signals may be received under Doppler effect.

The hybrid frequency offset detector 800 may determine a first frequency offset estimate based on a first pilot signal (1320). For some implementations, the single-burst frequency discriminator 820 may generate an un-aliased frequency offset estimate $f_{UN}$ based on two halves of the same pilot burst. For example, with reference to FIG. 9B, the single-burst frequency discriminator 820 may divide a single pilot burst 930 into two single-pilot bursts 932 and 934. The single-burst frequency discriminator 820 may then take the vector cross product of the first single-pilot burst 932 and the second single-pilot burst 934 to generate the un-aliased frequency offset estimate $f_{UN}$.

The hybrid frequency offset detector 800 may determine a second frequency offset estimate based on two or more successive pilot signals (1330). For some implementations, the multi-burst frequency discriminator 810 may generate a low-noise frequency offset estimate $f_{LN}$ based on two consecutively-received pilot bursts. For example, with reference to FIG. 9A, the multi-burst frequency discriminator 810 may generate the low-noise frequency offset estimate $f_{LN}$ by taking the vector cross product of the first pilot burst 910 and the second pilot burst 920.

Then, the hybrid frequency offset detector 800 may generate a third frequency offset estimate based at least in part on the first and second frequency offset estimates (1340). For some implementations, the de-aliasing module 830 may combine the frequency offset estimates $f_{LN}$ and $f_{UN}$ to generate a hybrid frequency offset estimate $f_H$ that is more accurate (e.g., un-aliased) than the low-noise frequency offset estimate $f_{LN}$ and more robust (e.g., less noisy) than the un-aliased frequency offset estimate $f_{UN}$. In one aspect, the de-aliasing module 830 may use the un-aliased frequency offset estimate $f_{UN}$ to de-alias the low-noise frequency offset estimate $f_{LN}$.

Figure 10:
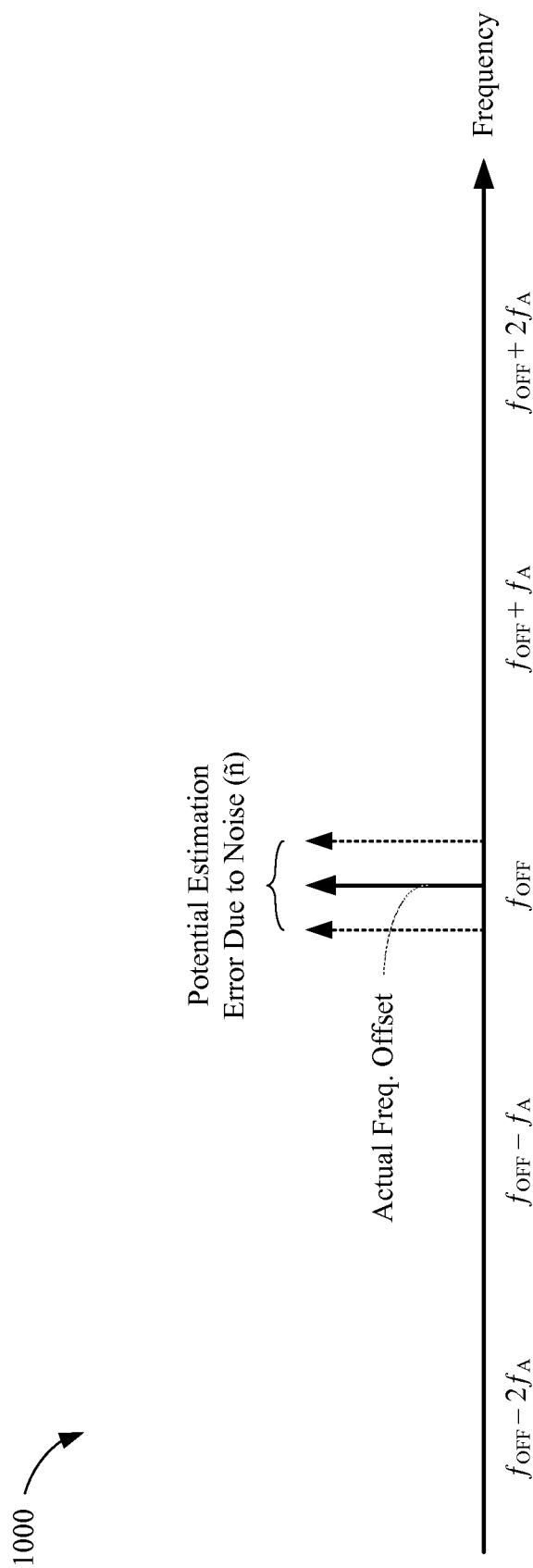
FIG. 10 shows a frequency diagram depicting example noise errors in frequency offset estimations based on split pilot bursts.

For example, with reference to the example frequency diagram 1000 of FIG. 10, the un-aliased frequency offset estimate $f_{UN}$ may provide an initial frequency range for the actual frequency offset estimate $f_{OFF}$. The de-aliasing module 830 may compare the un-aliased frequency offset estimate $f_{UN}$ with the low-noise frequency offset estimate $f_{LN}$ to determine the degree of aliasing that would place the low-noise frequency offset estimate $f_{LN}$ with that initial frequency range. The de-aliasing module 830 may then remove the aliasing factor from the low-noise frequency offset estimate $f_{LN}$ to generate the hybrid frequency offset estimate $f_H$.

FIG. 14 shows an illustrative flow chart depicting an exemplary operation 1400 for estimating a low-noise frequency offset without aliasing, in accordance with some implementations. With reference, for example, to FIG. 11, the operation 1400 may be performed by the hybrid frequency offset detector 1100 to determine a frequency offset estimate of a corresponding user terminal (e.g., UT 400 of FIG. 4) relative to the carrier frequency of a received communications signal. The hybrid frequency offset detector 1100 receives a pilot symbol from a satellite in non-geosynchronous orbit (e.g., from satellite 300) (1410). As described above, pilot signals received at the hybrid frequency offset detector 1100 may exhibit Doppler shifting due to the movements of the NGSO satellite. Moreover, there may be long durations of time between successive pilot symbols.

The first cross product generator 1110 takes the vector cross product of the received pilot symbol and a previous pilot symbol to generate a low-noise frequency offset estimate (1420). For example, a copy of each received pilot symbol $Y_n$ may be passed through delay stage 1160 to produce delayed pilot symbols $Y_{n+1}$ that are delayed by one symbol period. In some implementations, the first cross product generator 1110 forms a vector cross product between a given pilot symbol $Y_n$ and the preceding pilot symbol $Y_{n+1}$ to determine a phase error between the two symbols $Y_n$ and $Y_{n+1}$. This provides a low-noise (e.g., but aliased) measure of error in the phase rotation of the received communication signal. The first cross product generator 1110 may output the low-noise frequency offset estimate $f_{LN}$ representing the determined phase error.

The received pilot symbol is divided into two or more half-symbols (1430). For example, the pilot splitter 1130 may split the received pilot symbol $Y_n$ into two halves $Y_{n1}$ and $Y_{n2}$ of substantially equal lengths. In some implementations, the pilot splitter 1130 may divide the accumulated pilot signal data for each pilot symbol $Y_n$ by one-half of a symbol period so that the first half-symbol $Y_{n1}$ effectively "precedes" the second half-symbol $Y_{n2}$ in time.

The second cross product generator 1120 takes the vector cross product of the half-symbols to generate an un-aliased frequency offset estimate (1440). For some embodiments, the second cross product generator 1120 forms a vector cross product between the first half of the pilot symbol $Y_{n1}$ and the second half of the pilot symbol $Y_{n2}$ to determine a phase error between the two half-symbols. This provides an un-aliased (e.g., but noisy) measure of error in the phase rotation of the received communication signal. The second cross product generator 1120 may output the un-aliased frequency offset estimate $f_{UN}$ representing the determined phase error.

The un-aliased frequency offset estimate may be used to determine an aliasing interval of the low-noise frequency offset estimate (1450). As described above, the low-noise frequency offset estimate $f_{LN}$ is aliased but more robust against noise (e.g., as shown in Equation 2, above), whereas the un-aliased frequency offset estimate $f_{UN}$ is un-aliased but more susceptible to noise (e.g., as shown in Equation 3, above). Moreover, the frequency variation attributable to noise in the un-aliased frequency offset estimate $f_{UN}$ may be negligible compared to the frequency variation attributable to aliasing in the low-noise frequency offset estimate $f_{LN}$ (e.g., $|ñ|<<|f_4|$). Thus, in some implementations, the de-aliasing module 1140 may combine the un-aliased frequency offset estimate $f_{UN}$ with the low-noise frequency offset estimate $f_{LN}$ (e.g., by substituting Equation 3 into Equation 2, and eliminating the noise component ñ) to determine the aliasing interval (e.g., by solving Equation 4 for N).

Finally, the hybrid frequency offset detector 1100 may use the determined aliasing interval to de-alias the low-noise frequency offset estimate (1460). For some implementations, the de-aliasing module 1140 may generate a hybrid frequency offset estimate $f_H$ by substituting the aliasing interval N into Equation 2 and solving for the actual frequency offset estimate $f_{OFF}$. As a result, the hybrid frequency offset estimate $f_H$ may be more accurate (e.g., un-aliased) than the low-noise frequency offset estimate $f_{LN}$ and more robust (e.g., less noisy) than the un-aliased frequency offset estimate $f_{UN}$.

Figure 15:
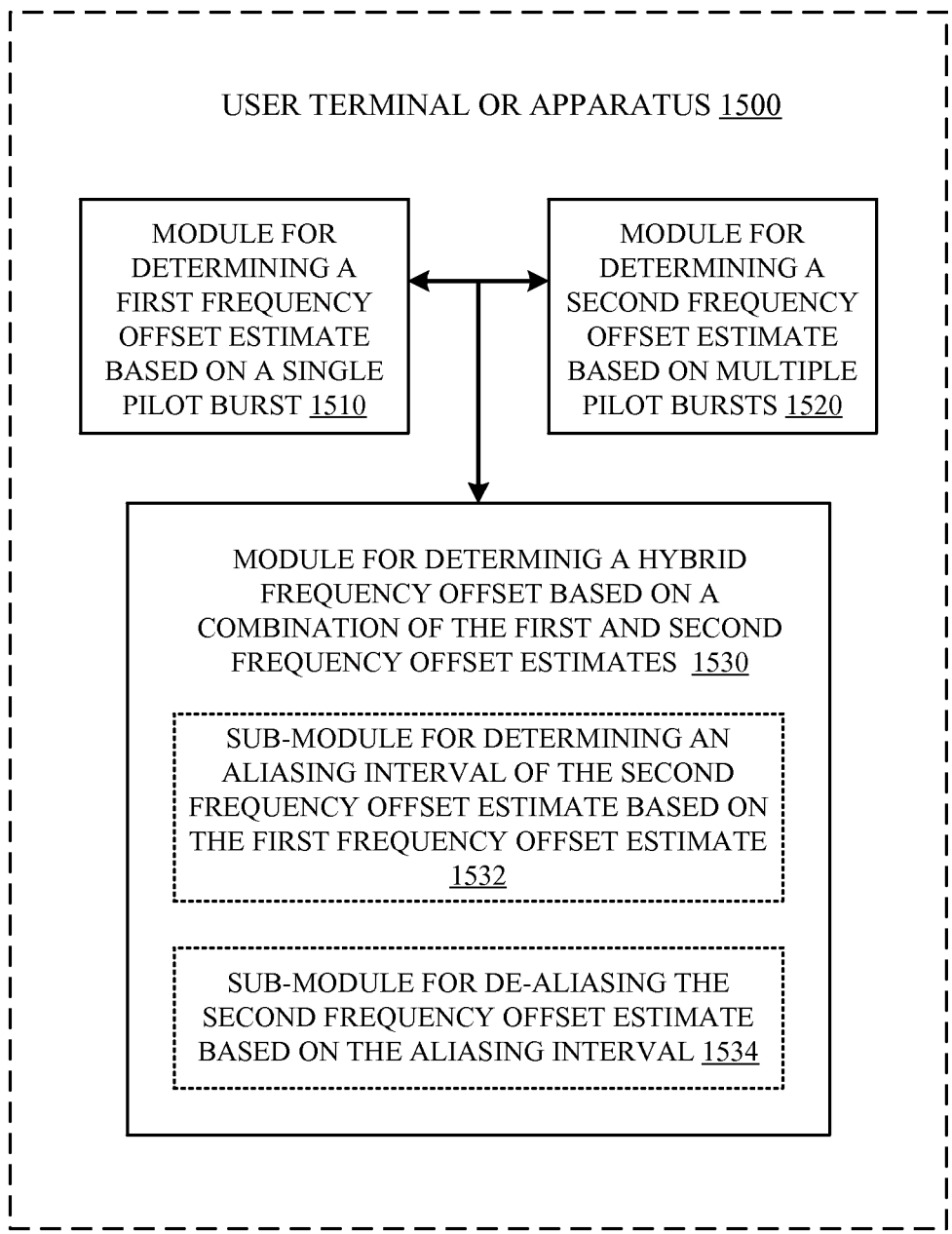
FIG. 15 shows a block diagram of several sample aspects of apparatuses configured to support hybrid frequency offset estimation operations as taught herein.

FIG. 15 shows an example user terminal or apparatus 1500 represented as a series of interrelated functional modules. A module 1510 for determining a first frequency offset estimate based on a single pilot burst may correspond at least in some aspects to, for example, a processor as discussed herein (e.g., processor 1220) and/to a single-burst frequency discriminator as discussed herein (e.g., single-burst frequency discriminator 820). A module 1520 for determining a second frequency offset estimate based on multiple pilot bursts may correspond at least in some aspects to, for example, a processor as discussed herein (e.g., processor 1220) and/to a multi-burst frequency discriminator (e.g., multi-burst frequency discriminator 810). A module 1530 for determining a hybrid frequency offset estimate based on a combination of the first and second frequency offset estimates may correspond at least in some aspects to, for example, a processor as discussed herein (e.g., processor 1220) and/to a de-aliasing module (e.g., de-aliasing module 830).

For some implementations, the module 1530 may include a sub-module 1532 for determining an aliasing interval of the second frequency offset estimate based on the first frequency offset estimate, which may correspond at least in some aspects to, for example, a processor as discussed herein (e.g., processor 1220) and/to an alias detector as discussed herein (e.g., de-aliasing module 1140). The module 1530 may further include a sub-module 1534 for de-aliasing the second frequency offset estimate based on the aliasing interval, which may correspond at least in some aspects to, for example, a processor as discussed herein (e.g., processor 1220) and/to a de-aliasing module as discussed herein (e.g., de-aliasing module 1140).

The functionality of the modules of FIG. 15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 15, as well as other components and functions described herein, may be implemented using any suitable means. Such means also may be implemented, at least in part, using corresponding structure as taught herein. For example, the components described above in conjunction with the "module for" components of FIG. 15 also may correspond to similarly designated "means for" functionality. Thus, in some aspects one or more of such means may be implemented using one or more of processor components, integrated circuits, or other suitable structure as taught herein.

The example implementations have been described in the context of satellite communication systems for exemplary purposes only. It is to be understood that the example implementations may be equally applicable to other wireless communications systems (e.g., cellular networks, pico networks, femto networks, etc.). For example, the frequency offset estimation techniques described herein can be applicable to communications governed by the IEEE 802.11 family of standards, Bluetooth®, HiperLAN (a set of wireless standards, comparable to the IEEE 802.11 standards, used primarily in Europe), and wireless signaling technologies.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of estimating a frequency offset of received signals, the method comprising:
   receiving a plurality of pilot signals from a transmitter;
   determining an un-aliased frequency offset estimate by dividing a first pilot signal of the plurality of pilot signals into two or more split-pilot signals and taking a vector cross product of the two or more split-pilot signals;
   determining a low-noise frequency offset estimate based on a vector cross product between the first pilot signal and a delayed first pilot signal, wherein an estimation noise of the low-noise frequency offset estimate is below a threshold noise level; and
   generating a hybrid frequency offset estimate based at least in part on the un-aliased frequency offset estimate and the low-noise frequency offset estimate, wherein the hybrid frequency offset estimate is un-aliased and has a lower estimation noise than the un-aliased frequency offset estimate.

2. The method of claim 1, wherein the pilot signals are received under Doppler effect.

3. The method of claim 1, wherein the low-noise frequency offset estimate is less susceptible to noise than the un-aliased frequency offset estimate.

4. The method of claim 1, wherein generating the hybrid frequency offset estimate comprises:
   combining the un-aliased frequency offset estimate and the low-noise frequency offset estimate.

5. The method of claim 4, wherein the low-noise frequency offset estimate is aliased.

6. The method of claim 5, wherein the combining comprises:
   de-aliasing the low-noise frequency offset estimate using the un-aliased frequency offset estimate.

7. The method of claim 6, wherein the de-aliasing comprises:
   comparing the un-aliased frequency offset estimate with the low-noise frequency offset estimate to determine an aliasing interval of the low-noise frequency offset estimate; and
   re-calculating the low-noise frequency offset estimate based at least in part on the determined aliasing interval.

8. A wireless communications device, comprising:
   a receiver to receive a plurality of pilot signals from a transmitter;
   one or more processors; and
   a memory storing instructions that, when executed by the one or more processors, cause the wireless communications device to:
      determine an un-aliased frequency offset estimate by dividing a first pilot signal of the plurality of pilot signals into two or more split-pilot signals and taking a vector cross product of the two or more split-pilot signals;
      determine a low-noise frequency offset estimate based on a vector cross product between the first pilot signal and a delayed first pilot signal, wherein an estimation noise of the low-noise frequency offset estimate is below a threshold noise level; and
      generate a hybrid frequency offset estimate based at least in part on the un-aliased frequency offset estimate and the low-noise frequency offset estimate, wherein the hybrid frequency offset estimate is un-aliased and has a lower estimation noise than the un-aliased frequency offset estimate.

9. The wireless communications device of claim 8, wherein the pilot signals are received under Doppler effect.

10. The wireless communications device of claim 9, wherein the low-noise frequency offset estimate is less susceptible to noise than the un-aliased frequency offset estimate.

11. The wireless communications device of claim 8, wherein execution of the instructions to generate the hybrid frequency offset estimate causes the wireless communications device to:
   combine the un-aliased frequency offset estimate and the low-noise frequency offset estimate.

12. The wireless communications device of claim 11, wherein the low-noise frequency offset estimate is aliased.

13. The wireless communications device of claim 12, wherein execution of the instructions to combine the un-aliased frequency offset estimate and the low-noise frequency offset estimate causes the wireless communications device to:
   de-alias the low-noise frequency offset estimate using the un-aliased frequency offset estimate.

14. The wireless communications device of claim 13, wherein execution of the instructions to de-alias the low-noise frequency offset estimate further causes the wireless communications device to:
   compare the un-aliased frequency offset estimate with the low-noise frequency offset estimate to determine an aliasing interval of the low-noise frequency offset estimate; and
   re-calculate the low-noise frequency offset estimate based at least in part on the determined aliasing interval.

15. A wireless communications device, comprising:
   means for receiving a plurality of pilot signals from a transmitter;
   means for determining an un-aliased frequency offset estimate by dividing a first pilot signal of the plurality of pilot signals into two or more split-pilot signals and taking a vector cross product of the two or more split-pilot signals;
   means for determining a low-noise frequency offset estimate based on a vector cross product between the first pilot signal and a delayed first pilot signal, wherein an estimation noise of the low-noise frequency offset estimate is below a threshold noise level; and
   means for generating a hybrid frequency offset estimate based at least in part on the un-aliased frequency offset estimate and the low-noise frequency offset estimate, wherein the hybrid frequency offset estimate is un-aliased and has a lower estimation noise than the un-aliased frequency offset estimate.

16. The wireless communications device of claim 15, wherein the pilot signals are received under Doppler effect.

17. The wireless communications device of claim 15, wherein the low-noise frequency offset estimate is less susceptible to noise than the un-aliased frequency offset estimate.

18. The wireless communications device of claim 15, wherein the means for generating the hybrid frequency offset estimate is to:
   combine the un-aliased frequency offset estimate and the low-noise frequency offset estimate.

19. The wireless communications device of claim 18, wherein the low-noise frequency offset estimate is aliased.

20. The wireless communications device of claim 19, further comprising:
   means for de-aliasing the low-noise frequency offset estimate using the un-aliased frequency offset estimate.

21. The wireless communications device of claim 20, wherein the means for de-aliasing the low-noise frequency offset estimate is to:
   compare the un-aliased frequency offset estimate with the low-noise frequency offset estimate to determine an aliasing interval of the low-noise frequency offset estimate; and
   re-calculate the low-noise frequency offset estimate based at least in part on the determined aliasing interval.

22. A non-transitory computer-readable medium storing instructions that, when executed by one or more processors provided within a wireless communications device, causes the wireless communications device to:
   receive a plurality of pilot signals from a transmitter;
   determine an un-aliased frequency offset estimate dividing a first pilot signal of the plurality of pilot signals into two or more split-pilot signals and taking a vector cross product of the two or more split-pilot signals;
   determine a low-noise frequency offset estimate based on a vector cross product between the first pilot signal and a delayed first pilot signal, wherein an estimation noise of the low-noise frequency offset estimate is below a threshold noise level; and
   generate a hybrid frequency offset estimate based at least in part on the un-aliased frequency offset estimate and the low-noise frequency offset estimate, wherein the hybrid frequency offset estimate is un-aliased and has a lower estimation noise than the un-aliased frequency offset estimate.

23. The non-transitory computer-readable medium of claim 22, wherein
   execution of the instructions to generate the hybrid frequency offset estimate causes the wireless communications device to:
   combine the un-aliased frequency offset estimate and the low-noise frequency offset estimate.

24. The non-transitory computer-readable medium of claim 22, wherein
   execution of the instructions to combine the un-aliased frequency offset estimate and the low-noise frequency offset estimate causes the wireless communications device to:
   de-alias the low-noise frequency offset estimate using the un-aliased frequency offset estimate.

* * * * *